Nov. 18, 1958 C. G. TALBOT ET AL 2,861,174
SIGNAL HAND LAMPS
Filed Oct. 2, 1953
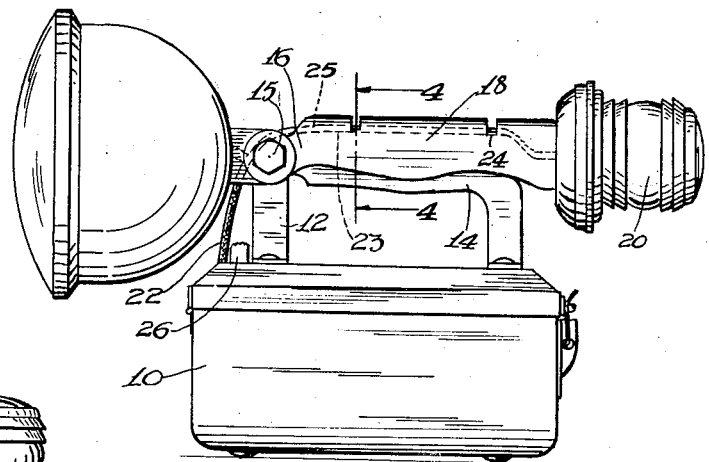
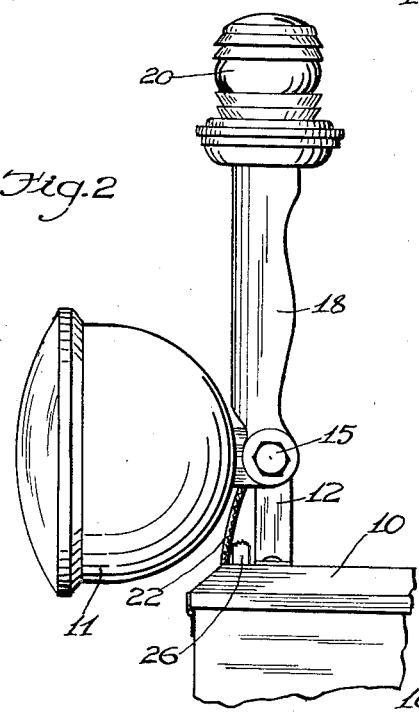
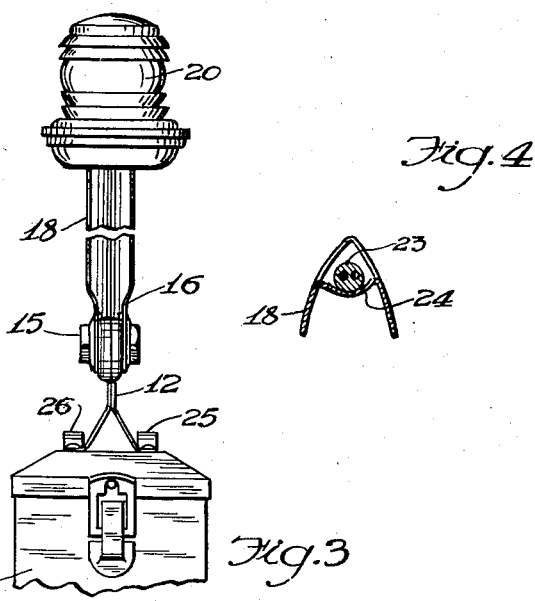
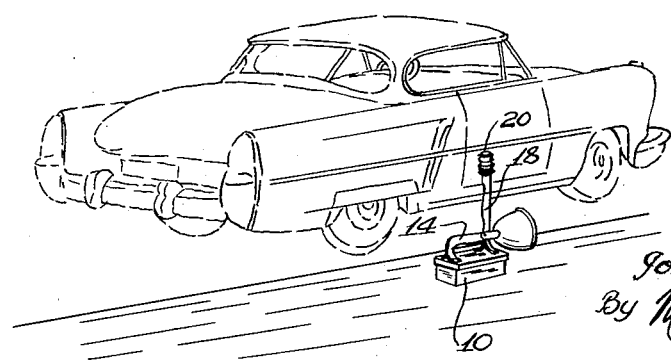
INVENTORS:
Cyrus G. Talbot
Joseph F. Talbot
By Niles B. Stevens & Co.
Attorneys.

United States Patent Office 2,861,174
Patented Nov. 18, 1958

2,861,174

SIGNAL HAND LAMPS

Cyrus G. Talbot and Joseph F. Talbot, Chicago, Ill.

Application October 2, 1953, Serial No. 383,892

4 Claims. (Cl. 240—10.63)

Our invention relates to electric hand lamps, and more particularly to the type patented by us on February 10, 1953, under No. 2,628,305, and it is one object of the present invention to extend the facility of the lamp to include a road signal which may be in view when the lamp is carried by hand or placed alongside the road.

A further object is to employ the holder of the head lamp as a base for the mounting of a bracket carrying the signal lamp.

A still further object is to mount the signal lamp bracket in a manner to make it adjustable from a low position over the handle of the lamp to direct the light from the signal lamp rearwardly, and to a vertical position placing the signal lamp at an elevation.

Another object is to construct the bracket of the signal lamp in a manner to form a channel for the passage of the current cord from the battery case to the signal lamp, with means included for the guided support of such cord.

An additional object is to provide a control for the head lamp and the signal lamp in the form of a pair of switch buttons which are installed in laterally spaced relation in the top of the battery case in a place of handy access.

With the above objects in view, a better understanding of the invention may be had by reference to the accompanying drawing, in which—

Fig. 1 is a side elevation of the improved hand lamp, showing the signal lamp in the low position;

Fig. 2 is a fragment of the illustration in Fig. 1, showing the signal lamp in the elevated position;

Fig. 3 is a rear view of the lamp case with the signal lamp in the elevated position, the bracket for the signal lamp being partly broken away;

Fig. 4 is an enlarged section on the line 4—4 of Fig. 1; and

Fig. 5 is a perspective view illustrating the position of the lamp as a road signal for automobiles.

In accordance with the foregoing, specific reference to the drawing indicates the battery case of the lamp at 10 and the standard to which the head lamp 11 is pivoted at 12. The standard is extended rearwardly with a horizontal handle 14.

For the purpose of the present invention, the pivoting bolt 15 of the standard 12 also receives one divided end portion 16 of a bracket 18, such bracket being channel-shaped, as indicated in Fig. 4. The opposite end of the bracket carries a red beam throwing signal lamp 20 which includes a flasher (not shown). The cord 22 which leads the current to the lead lamp 11 branches off with a section 23 which extends rearwardly in the hollow of the bracket 18, as shown more clearly in Fig. 4, for communication with the signal lamp 20. In order that the cord section 23 may not sag, a pair of supports 24 are provided for it in the bracket 18. Thus, such supports are straps struck down from the top of the bracket, as shown in Fig. 4.

The normal position of the bracket is horizontal over the handle 14, as shown in Fig. 1. When so constituted, the hand lamp may be carried by one walking in the dark in a passageway, alley or along a highway. The head lamp 11 now will illuminate the region ahead, while the signal lamp 20 will serve as an indication to the rear to be noticed by automobilists and others. The circuit of the lamp includes two switch buttons 25 and 26 located conveniently in front of the standard 12, one of these buttons controlling the head lamp 11 and the other the signal lamp 20. Thus, either lamp may be turned off if only one is needed.

The novel hand lamp also is useful for roadside repair or inspection in case an automobile develops tire trouble. In such event, it is customary to set a light alongside the road to illuminate the zone of the trouble, and the head lamp 11 is therefore useful in the present case for this purpose. However, for purposes of safety against traffic from behind, it is also of advantage to display a signal, and such facility is found in the flashing red signal lamp 20. As originally positioned, this signal lamp is too low to be seen from a distance far behind, and the bracket 18 therefore may be swung to the vertical position indicated in Figs. 2 and 3 in order to elevate the signal lamp to a height clearly visible from all directions. Thus, the signal lamp is visible from the front to approaching drivers, so that they may take notice that a car has stopped along the highway. In the elevated position the signal lamp serves as a safety indicator when the stop has been made not only on account of tire trouble but for any other reason, so that the presence of the automobile alongside the road or on the edge thereof is indicated in both directions by the elevated signal lamp.

It will now be apparent that the novel improvement is not only a safety device for those who walk in the dark in passageways, alleys, on dark streets, or along highways, but is also a clearly visible signal for an automobile which is standing alongside a highway when it is dark. In such event, the ordinary tail light of the automobile may serve as an indication thereof, but only to the rear and not with any means of attracting attention. In the present case, the signal lamp is of the flasher type, and mounted in a manner to be raised to an elevated position, so that it may be seen easily from a distance from all sides. Further, the improved lamp is a simple extension of the conventional battery-operated hand lamp. Further, the mounting of the flashing signal is by means of a bracket which fits compactly over the handle of the lamp and therefore is not in the way when the lamp is stored or carried. Finally, the mounting is conveniently pivoted on the same support as the head lamp, making the assembly a compact one.

While we have described the invention along specific lines, various minor changes or refinements may be made therein without departing from its principle, and we reserve the right to employ all such changes and refinements as may come within the scope and spirit of the appended claims.

We claim:

1. The combination with a hand lamp having a frontal standard, a head lamp pivoted to the same, and a handle extending rearwardly from the pivoting zone of the standard; of a bracket attached to the standard in said zone, and a signal lamp carried by said bracket, the bracket being hinged on the pivot of the head lamp and swingable from a folded position over the handle directing the signal lamp rearwardly to an upright position placing the signal lamp high and visible from a distance and all sides.

2. The combination with a hand lamp having a frontal standard, a head lamp pivoted to the same, and a handle extending rearwardly from the pivoting zone of the standard; of a bracket attached to the standard in said zone, and a signal lamp carried by said bracket, the bracket being mounted on the pivot of the head lamp and channeled along the underside to encase the handle from above.

3. The combination with a hand lamp having a frontal standard, a head lamp pivoted to the same, and a handle extending rearwardly from the pivoting zone of the standard; of a bracket attached to the standard in said zone, and a signal lamp carried by said bracket, the bracket being mounted on the pivot of the head lamp and channeled along the underside, a feed cord for the signal lamp rising into the channel of the bracket from the front and extending rearwardly in the same to enter the signal lamp, and supporting means in the bracket for said feed cord.

4. The combination with a hand lamp having a frontal standard, a head lamp pivoted to the same, and a handle extending rearwardly from the pivoting zone of the standard; of a bracket attached to the standard in said zone, and a signal lamp carried by said bracket, the bracket being mounted on the pivot of the head lamp and channeled along the underside, a feed cord for the signal lamp rising into the channel of the bracket from the front and extending rearwardly in the same to enter the signal lamp, and supporting means in the bracket for said feed cord, said supporting means comprising transverse straps struck down from the crown of the bracket at longitudinally spaced points.

References Cited in the file of this patent

UNITED STATES PATENTS

| | | |
|---|---|---|
| 1,170,012 | Smith | Feb. 1, 1916 |
| 2,581,129 | Muldoon | Jan. 1, 1952 |
| 2,611,072 | Potekin | Sept. 16, 1952 |
| 2,628,305 | Talbot et al. | Feb. 10, 1953 |

FOREIGN PATENTS

| | | |
|---|---|---|
| 101,300 | Great Britain | Sept. 7, 1916 |